United States Patent [19]

Baghdady

[11] Patent Number: 4,975,710

[45] Date of Patent: Dec. 4, 1990

[54] METHODS AND APPARATUS FOR DIRECTION OF ARRIVAL MEASUREMENT AND RADIO NAVIGATION AIDS

[76] Inventor: Elie J. Baghdady, 190 North Ave., Weston, Mass. 02193

[21] Appl. No.: 387,761

[22] Filed: Aug. 1, 1989

[51] Int. Cl.$^5$ .............................................. G01S 5/04
[52] U.S. Cl. .................................... 342/442; 342/433
[58] Field of Search ........................ 342/442, 433, 424

[56] References Cited

U.S. PATENT DOCUMENTS

| | | |
|---|---|---|
| 3,935,574 | 1/1976 | Pentheroudakes . |
| 4,207,572 | 1/1980 | Hipp et al. . |
| 4,626,859 | 12/1986 | Stansfield . |
| 4,639,733 | 1/1987 | King et al. . |
| 4,768,034 | 8/1988 | Preikschat . |

OTHER PUBLICATIONS

"New Developments in Direction-Of-Arrival Measurement Based on Adcock Antenna Clusters", Baghdady, NAECON '89, May 89.
"IDFM: A Novel Technique for Tracking, Navigation Aid and Flight Traffic Curveillance", Baghdady, NAECON '75, May 1975.
"Frequency Modulation by Synthetic Doppler: Theory and Some Novel Applications", Baghdady, NAECON '87, May 1987.
"Directional Signal Modulation by Means of Switched Spaced Antennas", Baghdady, MILCOM '87, Oct. 1987.

*Primary Examiner*—Theodore M. Blum
*Attorney, Agent, or Firm*—Burns, Doane, Swecker & Mathis

[57] ABSTRACT

The disclosure relates to methods, algorithms and apparatus for direction-of arrival (DOA) measurement/computation based on long-baseline, phase-difference, paired-antenna interferometry and on DOA-computing array processing algorithms. Specifically, methods and algorithms based on direct, cyclically unambiguous estimation of the cosine of the DOA are described for resolving the cyclic ambiguities in long-baseline, phase-difference paired-antenna interferometers, and for steering the computations to the vicinities of the solutions in computation-intensive array processing algorithms, thereby reducing computation load and time. The invention enables the design of DOA-determination systems and radio navigation aids that combine desirable characteristics (such as high resolution and accuracy, simpilicity, low cost, self-calibration, etc.) of different methods of extracting/computing DOA data from the outputs of antenna elements that are positioned in diverse arrangements for realizing complementary apertures.

41 Claims, 4 Drawing Sheets

METHODS AND APPARATUS FOR DIRECTION OF ARRIVAL MEASUREMENT AND RADIO NAVIGATION AIDS

BACKGROUND OF THE INVENTION

This disclosure relates to methods, algorithms and apparatus for enabling unambiguous, high-resolution measurement/computation of the direction of propagation of a traveling wavefront.

It is well-known in the art of measuring direction of arrival (henceforth, DOA) of a traveling wave that the resolution, accuracy and immunity to multipath and multi-signal interference of the measurement are increased by increasing the physical aperture of the receiving sensor in emitter location relative to the receiver, and of transmitting illuminator in receiver location relative to the transmitter (as in radio navigation aids). Said physical aperture may be realized either by a "continuous" structure (a reflector or a lens) that collects incident energy over the extent of the aperture and focuses it onto a receiving "point" sensor, or beams it out of a "point" radiator; or by a spatially spread set of discrete (receiving or transmitting) units which in effect "sample" a physical area or volume. This invention relates to the latter method of realizing a physical aperture, and "aperture" is defined here as the maximum physical lineal separation between members of said discrete set.

This invention relates to discrete aperture-sampling sets of antennas with which the direction of propagation of a traveling wavefront is ultimately derived either from the phase-shift differences between the outputs of the most widely separated pairs of antennas, or by employing the outputs of the various discrete antennas to set up an algebraic system which is then solved for characteristic indicators of said direction of propagation. In this disclosure we shall refer to the phase-shift difference method as *paired-antenna interferometry* (or PAI, for short), and to the algebraic system approach as the *DOA-computing array processing algorithm* (or APA, for short) approach.

The baseline length of a paired-antenna, phase-difference measuring interferometer (PAI) is the key parameter for high-resolution and accuracy of direction-of-arrival (DOA) measurement by this means. The baseline length is in essence the aperture of a DOA sensor in which this sensing is based on the phase difference accumulated by the incident wavefront in transit from one end of the baseline to the other. If the path length traversed between these ends is equivalent to more than one wavelength of the incident wave, then the corresponding phase shift will include an integer multiple of $2\pi$ rad that will not be revealed by a phase-difference detector. The phase-difference measurement is then said to be *cyclically ambiguous*. Cyclic ambiguity is resolved in prior art by means of other phase-difference measurements that are also subject to cyclic ambiguity that are performed in parallel between the outputs of additional pairs of antennas separated by judiciously chosen, progressively shorter baseline lengths; or, in cooperative situations that so avail, between the outputs of the same pair of antennas, on components of the same signal that differ appropriately in frequency. As a result, complexity and cost of an interferometer go up with baseline length, largely because of escalating costly provisions for resolving the cyclic ambiguities. The special design requirements and the added initial nonrecurring acquisition cost and later recurring calibration, operation and maintenance costs, of the prior art methods of cyclic ambiguity resolution, set severe limits on affordable or permissible aperture extent (interferometer baseline length).

The technique disclosed herein provides a means for resolving the cyclic ambiguities of the phase difference between wavefronts of the same signal wave at the positions of a pair of antennas that are separated by a baseline length equal to an an arbitrary number of wavelengths of said signal wave by employing a method of directly obtaining a first estimate of the cosine of the direction of arrival (DOA) through a cyclically unambiguous, or non-PAI, measurement. In this disclosure, we introduce the concept of "hybrid interferometry", wherein one opts to employ longbaseline phase-difference-measurement interferometry only for the "fine" measurement of the DOA, and other means for the "first estimate" or "coarse" measurement, that resolves the cyclic ambiguity in the fine measurement.

It is therefore an object of this invention to provide an alternative method and means for resolving long interferometer baseline phase-difference cyclic ambiguities at significant reduction in costs and complexity in comparison with said prior art methods, and thus eliminate the ambiguity resolution requirement of a long-baseline PAI as a primary factor limiting affordable baseline length.

The invention also applies to DOA-computing array processimg algorithms (or APA's) such as those known in the art by the descriptive labels of beamforming, maximum-likelihood, MUSIC (for multiple signal classification) and ESPRIT (for estimation of signal parameters via rotational invariance techniques). Characteristically, all said algorithms involve complex and lengthy computations that inherently start with a search-and-plot procedure to reveal the peaks of a measure or an indicator of signal presence versus DOA. In all of said APA's, the computation load and time would be significantly reduced if additional information is provided to point the way to solutions in the form of at least coarse first estimates of DOA's of some or all incident signals picked up by the antennas in the array.

It is therefore another object of this invention to provide a method for significantly reducing the computation load and time of DOA-computing APA's by employing a method of directly obtaining first estimates of the cosines of the DOA's of some or all of a number of incident signals, and hence restricting the required computations only to the refinement of those estimates.

It is yet a further object of this invention to provide methods and algorithms for estimatimg the cosine of the direction of arrival of a wavefront that are not subject to, or require/involve resolution of, cyclic ambiguity.

These and other objects and features of this invention will become apparent from the claims, and from the following description when read in conjunction with the accompanying drawings.

DETAILED DESCRIPTION

Figure 1:
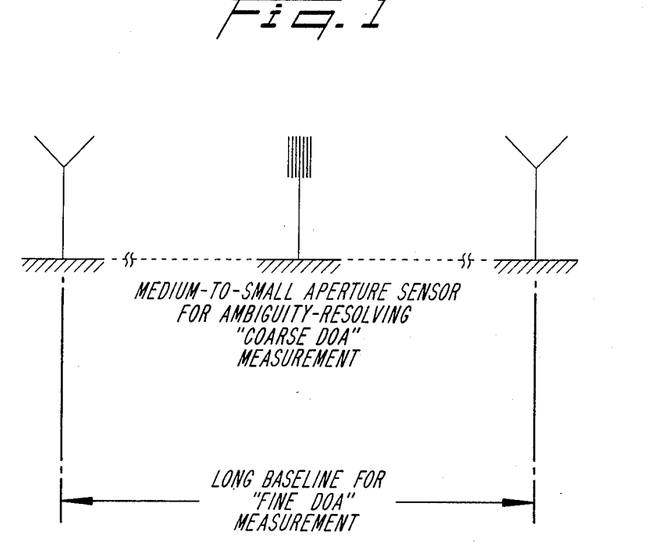
FIG. 1 is a diagram of a long-baseline interferometer employing an ambiguity resolving subsensor according to the invention.

The hybrid interferometry concept is illustrated in FIG. 1. In this concept, a nonambiguous, coarse DOA measurement is performed in some manner other than phase-difference interferometry, with accuracy sufficient to completely resolve the ambiguity of a fine measurement based on an extended baseline defined only by two widely spaced antennas. For purposes of economy, the coarse measurement is carried out in terms of a direction-dependent parameter not subject to cyclic ambiguity, by means of a moderate-to-small-aperture sensor; i.e., one with an aperture much smaller than the highly cyclically ambiguous long-baseline, phase-difference interferometer.

For a wavefront $\cos \omega_c t$ with a wavelength, $\lambda = c/(\omega_c/2\pi)$, the difference, $T_\phi$, in times of arrival at two antennas spaced L apart causes a phase shift difference between the pick-ups of the signal by these antennas, expressible as $$\omega_c T_\phi = \omega_c(L\cos \phi)/c \qquad (1)$$
$$= 2\pi(L/\lambda)\cos \phi$$

where
  L = Distance separating the two antennas, the so-called baseline length
  $\phi$ = Radial angle of incidence of the wavefront relative to the orientation of the line connecting the antennas
  c = The speed of propagation
For $(L/\lambda) \cos \phi > 1$, the right-hand-side of Eq. (1) is expressible as $$2\pi(L/\lambda) \cos \phi = 2\pi K + \delta \qquad (2)$$

where K = an integer, and $0 \leq \delta < 2\pi$. Inasmuch as cycles of a sinewave are indistinguishable one from the other, the component $2\pi K$ is not detectable as a phase difference between two replicas of the same sinewave, and the only output of a phase-difference detector will be $\delta$. Such a measurement is therefore said to be "cyclically ambiguous", meaning of course ambiguous in the number K of full $2\pi$'s that must be added to $\delta$ in order to account fully for the effect of the difference, $T_\phi$, between the times of arrival of the wavefront at the two separated antennas.

In practice, the two components of phase difference in Eq. (2) are determined separately: $2\pi K$ by a coarse measurement (i.e., not as fine a measurement as for the full baseline, but) fine enough to provide for the ambiguity resolution (henceforth, AR); and $\delta$ by a "fine" measurement to bring out the baseline instrumental resolution (henceforth, BIR) and accuracy in the determination of the baseline end-to-end phase difference, and, hence, the direction cosine, $\cos \phi$.

Of all the variables in Eq. (2), only K cannot be measured directly, and therefore must be inferred from measurements of the other quantities. Since K is a discrete integer, its value is quantized, changing in quantum steps of unity. Accordingly, measurements leading to it need only be "fine" enough to yield a number within $\pm \frac{1}{2}$ of the actual K.

The traditional method of performing the measurement leading to K is to exploit the fact that the ratio $L/\lambda$ can be arranged, a priori, to have a set of values judiciously chosen to provide a progression of reduced (and hence less precise) actual (if different values of L are used) or virtual/electical (if different frequencies, or $\lambda$'s, are simultaneously received) baseline lengths. This enables a number of different phase-difference measurements to be performed in parallel on either (i) the outputs of 3 or more antennas paired to provide a set of exactly known baseline lengths, the shorter ones resolving the ambiguities of the longer ones, leading in the end to the AR of the longest baseline; or (ii) on sinewaves of different frequencies originating in the same source and picked up by the same baseline pair of antennas, or by 3 or more antennas arranged for a judicious selection of baseline lengths.

The alternative to the traditional method, offered by the hybrid interferometry approach, follows from solving Eq. (2) for K, yielding $$K = (L/\lambda) \cos \phi + \delta/2\pi \qquad (3)$$

Since $\delta$ is measured with high resolution, and $L/\lambda$ is, a priori, known or measurable with high precision, we need only measure $\cos \phi$ to within a resolution, $\epsilon_{\cos \phi}$, such that $$(L/\lambda)|\epsilon_{\cos \phi}| < \frac{1}{2} \qquad (4)$$

Accordingly, the measurement of $\cos \phi$ need be good only to within a peak error of $$|\epsilon_{\cos \phi}|_{peak} = 1/(2L/\lambda) \qquad (5)$$

A $\cos \phi$ measurement of such coarseness should therefore be sufficient to resolve the cyclic phase-difference ambiguities of a baseline of length $$L/\lambda < (\tfrac{1}{2})/|\epsilon_{\cos \phi}|_{peak} \qquad (6)$$

If the error in computing K form the substitution of results of measurements in Eq. (3) is attributed to random errors in the measurements, then the mean squared error in computing K from Eq. (3) is given by $$\sigma_K^2 = (L/\lambda)^2 \sigma_{\cos \phi}^2 + \sigma_\delta^2/(2\pi)^2 \qquad (7)$$

The distinction between coarse and fine measurements allows us to attribute an uncertainty $\epsilon_K$ in K entirely to the coarse measurement of $\cos \phi$, in which case we drop the second term on the right-hand-side of Eq. (7). If further we attribute the error in measuring $\cos \phi$ to additive gaussian noise with a peak factor p, the probability that the error $\epsilon_K$ in computing K from the measurement of $\cos \phi$ will exceed a peak of $p\sigma_K$ is given by $$P(\epsilon_K > p\sigma_K) = 1 - erf(p/\sqrt{2}) \quad (8)$$

where erf( . . . ) is the error function. Since $\epsilon_K$ must not exceed $\frac{1}{2}$ if the ambiguity is to be resolved correctly, we set $p\sigma_K=\frac{1}{2}$, which then enables us to express the probability that the coarse measurement of $\cos \phi$ will not correctly resolve the ambiguity for the long baseline as $$P(\epsilon_K > \tfrac{1}{2}) = 1 - erf(1/\{2\sqrt{2}\,(L/\lambda)\sigma_{\cos \phi}\}) \quad (9)$$

Expressions for $\cos \phi$ will next be determined for a number of candidate methods for providing AR estimates of $\cos \phi$. The techniques considered are all based on measurables that are intrinsically free of cyclic ambiguities.

ADCOCK-SENSOR-BASED AMBIGUITY RESOLVERS

Antennas arranged with uniform spacing around the perimeter of a circle can be employed in at least two ways that we consider here for the AR coarse measurement of $\cos \phi$: As an Adcock directional sensor, or for inducing $\cos \phi$-dependent sinusoidal FM. In this Section, we consider the Adcock-based techniques.

In an Adcock directional sensor, the outputs of diametrically opposite pairs of antennas are first subtracted one from the other. The result for the pair separated by the diameter at azimuth angle $\theta_1$ relative to North is, in response to a wavefront described by $\cos \omega_c t$ at the center of the circle, $$e_{\theta 1}(t) = 2E_s \cos \alpha \sin\{(\pi D/\lambda)\cos \alpha \cos(.\theta_1-\theta)\}\sin \omega_c t \quad (10)$$

where
  $\alpha$ = Elevation angle of arrival above the plane of the circle
  $\theta$ = Azimuth angle of arrival relative to North $$\cos \phi = \cos \alpha \cos \theta \quad (11)$$

D = Diameter of circle
  $\lambda$ = Wavelength of incident wave
  $E_s$ = Amplitude level factor It can be shown {1} that if the differenced outputs of a sufficient number of diametrically opposite pairs of antennas are combined in a prescribed way, then, except for a sequence of forbidden discrete values of $D/\lambda$, we can synthesize two resultant signals described by $$e_{NS}(t) \approx (n/2)E_s(\pi D/\lambda)\{\cos^2\alpha \cos \theta\}\sin \omega_c t, \quad (12)$$

Corresponding to a North-South diameter and $$e_{EW}(t) \approx (n/2)E_s(\pi D/\lambda)\{\cos^2\alpha \sin \theta\}\sin \omega_c t, \quad (13)$$

Corresponding to an East-West diameter where n=(even) number of antennas around the perimeter of the circle. If, further, an antenna is placed at the center of the circle, then its output will be $$e_o(t) = E_s \cos \alpha \cos \omega_c t \quad (14)$$

Inspection of the above equations shows that if the amplitudes in Eqs. (12) and (14) are first detected, then $$\frac{1}{(n/2)(\pi D/\lambda)} \cdot \frac{\text{Amplitude of } e_{NS}(t)}{\text{Amplitude of } e_o(t)} = \cos \phi \quad (15)$$

Alternatively, we may first phase-shift the output of the center antenna $\pi/2$ rad to obtain $$e_{o,\pi/2}(t) = E_s \cos \alpha \sin \omega_c t \quad (16)$$

From Eqs. (12) and (16), we have $$\frac{1}{(n/2)(\pi D/\lambda)} \cdot \frac{e_{NS}(t)}{e_{o,\pi/2}(t)} = \cos \phi \quad (17)$$

The division of hte predetected outputs can be performed computationally (digitally) at a very low IF.

Figure 2:
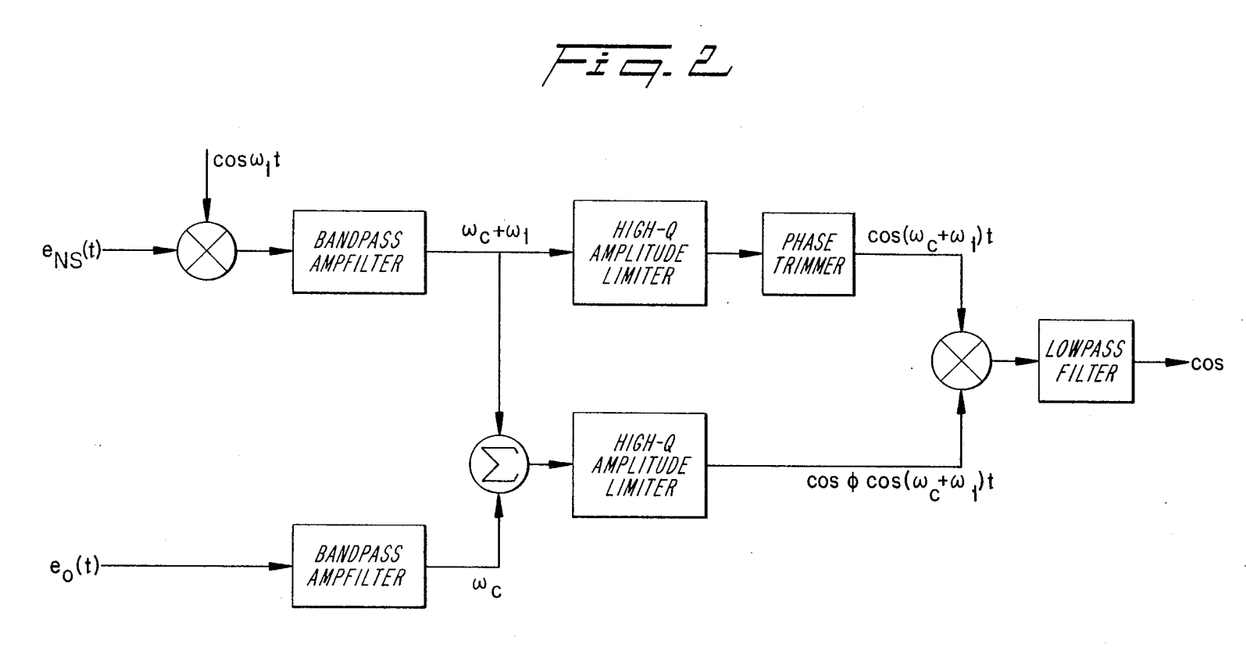
FIG. 2 is a block diagram embodiment of an algorithm for deriving an ambiguity resolving estimate of the direction cosine from the outputs of spaced antennas according to the invention.

In a third alternative, $\cos \phi$ can be extracted by the analog structure shown in FIG. 2. With reference to this figure, the ratio of amplitudes in Eq. (15) is obtained by means of an amplitude limiter. First, one of the two signals, $e_{NS}(t)$ in FIG. 2, is shifted in frequency by a fixed amount, denoted $\omega_1$, sufficient to make signals at $\omega_c$ and $\omega_c + \omega_1$ separable compoletely by an ordinary filter. The frequency-shifted signal is then added to the other signal, with the signal corresponding to $e_o(t)$ at least a few times stronger than that corresponding to $e_{NS}(t)$. Amplitude-limiting the sum then effects the division of amplitudes required in Eq. (15) by yielding in the output of the limiter a signal component centered at the frequency of the input to the adder corresponding to $e_{NS}(t)$, whose amplitude is the desired ratio of amplitudes. A second amplitude limiter in the upper parallel branch operates on the signal corresponding to $e_{NS}(t)$ to deliver a corresponding frequency-reference signal with a constant amplitude independent of DOA. This latter signal is phase-shifted $\pi/2$ rad, and then used to coherent-product demodulate the amplitude of the signal out of the lower branch, yielding a voltage proportional to $\cos$ (DOA) out of the lowpass filter. The structure in FIG. 2 embodies an algorithm that can also be implemented digitally/computationally.

For a fourth alternative, note that the ratio of the amplitude in Eq. (13) to that in Eq. (12) is $\tan \theta$; from which $$\cos \theta = 1/\sqrt{1 + \tan^2\theta} = \frac{\text{Amplitude of } e_{NS}(t)}{\sqrt{\Sigma\{\text{Squares of Amplitudes of } e_{NS}(t) \,\&\, e_{EW}(t)\}}} \quad (18)$$

Moreover, $$\cos \alpha = \frac{\sqrt{\Sigma\{\text{Squares of Amplitudes of } e_{NS}(t) \,\&\, e_{EW}(t)\}}}{(n/2)(\pi D/\lambda)(\text{Amplitude of Center Antenna Output})} \quad (19)$$

Substitution from Eqs. (18) and (19) into Eq. (11) yields $\cos \phi$. (Note that the general expression that results from this substitution actually reduces to the expression in Eq. (15).)

Expressions for errors in the determination of $\cos \phi$ are derived by assuming errors in the measured quantities in Eq. (15). The results are $$\epsilon_{\cos \phi} \approx \{(n/2)(\pi D/\lambda)\}^{-1}(\epsilon_{NS}/A_o) - (\epsilon_o/A_o)\cos \phi \quad (20)$$

$$|\epsilon_{\cos\phi}| \leq \{(n/2)(\pi D/\lambda)\}^{-1}|\epsilon_{NS}|/A_o + |\epsilon_o|/A_o \quad (21)$$

and, for random errors, $$\sigma_{\cos\phi,\,max}^2 = \{\sigma_{NS}^2/(n\pi D/2\lambda)^2 + \sigma_o^2\}/A_o^2 \quad (22)$$

where
$A_o$ = Amplitude of output of Center Antenna
$\epsilon_o$ = Error in measurement of $A_o$
$\epsilon_{NS}$ = Error in measurement of amplitude of $e_{NS}(t)$
and $\sigma_o$ and $\sigma_{NS}$ are the rms values of random errors.

AR BASED ON INDUCED SINUSOIDAL DOPPLER FM

A basis for DOA measurement is provided not only by phase change accured through the motion of the wavefront through the sensor aperture, but also by the rate of change of phase (the Doppler frequency shift) induced by moving a receiving antenna through the successive positions of the wavefront across the sensor aperture. Any motion of a receiving antenna relative to the source of radiation induces a Doppler frequency shift that depends in particular on the DOA of the incident wavefront. In situ motion of a receiving antenna can be controlled so that it results in Doppler-shift modulation that can be detected unambiguously to provide $\cos\phi$. Two types of motion are of interest here: Circular motion and rectilinear motion. In this Section, we consider circular-motion-induced Doppler(CID).

Consider an antenna in cicular motion. An incident signal described by $\cos\omega_c t$ will be transformed by the rotation of the receiving antenna into an exponent-modulated signal at the receiver input, described by $$e_{rec}(t) = E_s \cos\alpha \cos\{\omega_c t + \psi(t)\} \quad (23)$$

where $E_s$ is an amplitude-level factor, $$\psi(t) = (2\pi r/\lambda)\cos\alpha\cos(\omega_m t - \theta) \quad (24)$$

$\theta$ is measured relative to the orientation of a reference diameter, and $\alpha$ above the plane, of the circle. An FM demodulator delivers $$\begin{aligned}e_{out}(t) &= \kappa_d(\omega_m r/\lambda)\cos\alpha\,\sin(\omega_m t - \theta) \\ &= \kappa_d(\omega_m r/\lambda)\{\cos\phi\sin\omega_m t - \cos\alpha\sin\theta\cos\omega_m t\}\end{aligned} \quad (25)$$

where $\kappa_d$ is a proportionality constant. This shows that $$\cos\phi = \frac{1}{G} h_{lp}(t) \otimes \{e_{out}(t)\sin\omega_m t\} \quad (26)$$

where $\otimes$ denotes convolution; $h_{lp}(t)$ is the unit-impulse response of a lowpass filter that passes 0 Hz and rejects all frequencies at and above $\omega_m$ rad/s, and has a DC response given by $H_{lp}(j0)$; and $$G = \{\kappa_d(\omega_m r/\lambda)H_{lp}(j0)\}/2 \quad (27)$$

Figure 3:
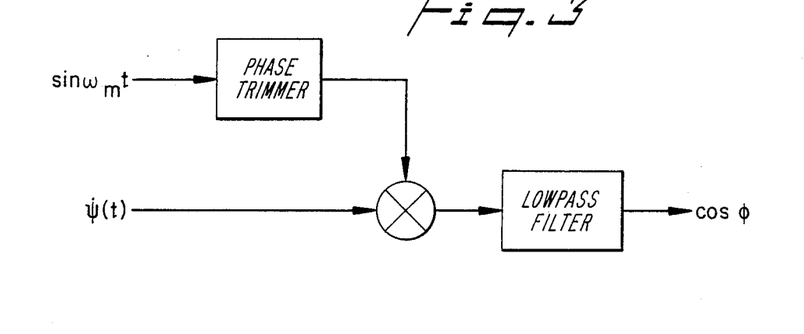
FIG. 3 is a block diagram of an embodiment of the invention for deriving the value of the cosine of the radial direction of arrival of a signal wavefront from the detected sinusoidal Doppler frequency modulation induced by simulating antenna around the perimeter of a circle.
Figure 4:
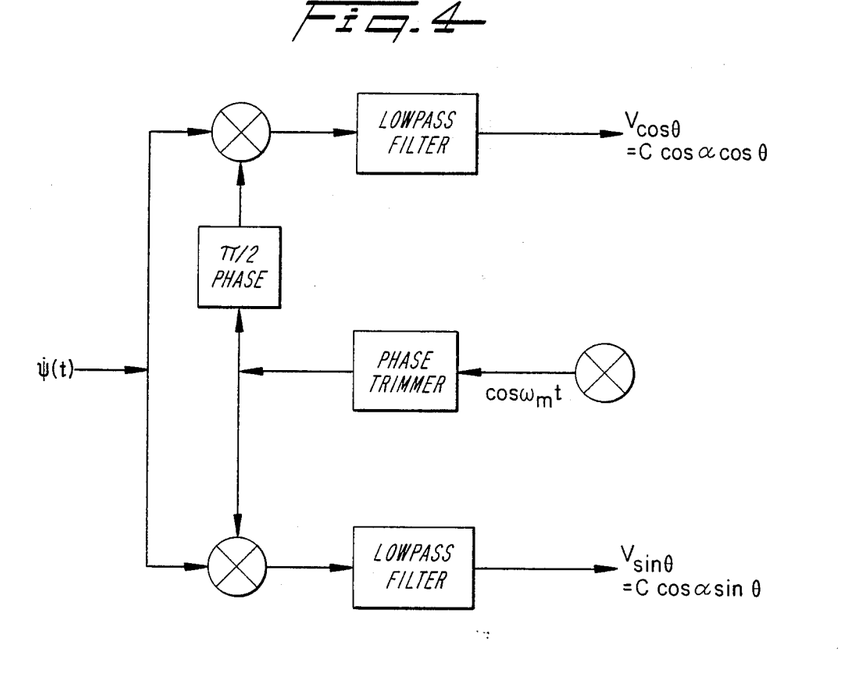
FIG. 4. is a block diagram of yet another embodiment for deriving determinants of the radial direction cosine from induced sinusoidal Doppler frequency modulation according to this invention.

The operations expressed in Eq. (26) can be implemented as shown in FIG. 3. FIG. 4 shows how $\alpha$ and $\theta$ can be extracted from $e_{out}(t)$.

Expressions for errors in the determination of $\cos\phi$ are derived by assuming errors in in the measured quantities in Eq. (26). The results are $$|\epsilon_{\cos\phi}|_{max} \simeq |\epsilon_\theta|_{max} + |\epsilon_{Am}|_{max}/A_m \quad (8)$$

and, for random errors, $$\sigma_{\cos\phi,max}^2 = \sigma_{74}^2 + \sigma_{Am}^2/A_m^2 = \sigma_{Am}^2/(A_m^2/2) \quad (29)$$

where $$\begin{aligned}A_m &= \kappa_d(\omega_m r/\lambda)\cos\alpha \\ &= \text{Amplitude of detected tone in Eq. (25)}\end{aligned}$$

$\epsilon_{Am}$ = Error in determination of $A_m$
$\epsilon_\theta$ = Error in the phase of detected tone
$\sigma_{Am}$ and $\sigma_\theta$ are rms values of random errors $$\sigma_{Am}^2 = N_o f_m^2 \beta_n / P_s \quad (30)$$

$$\sigma_\theta^2 = 1/\{2(A_m^2/2)/\sigma_{Am}^2\} = \sigma_{Am}^2/A_m^2 \quad (31)$$

$N_o$ = Pre-FM-demodulation (i.e., IF) noise power spectral density, in watts/Hz or Joules
$f_m = \omega_m/2\pi$
$\beta_n$ = Effective noise bandwidth of an output bandpass filter centered at $f_m$ Hz, in Hz
$P_s$ = Pre-FM-demodulation (i.e., IF) average signal power, in watts $$P_s/(N_o B_{nIF}) \geq 10 \text{ dB}$$

$B_{nIF}$ = Pre-FM-demodulation (i.e., IF) effective noise bandwidth, in Hz
and the max's in Eqs. (28) and (29) are for $\alpha = 0$ and $\theta = 0$.

In situ antenna motion at speeds that are not mechanically feasible can be effectively and very accurately synthesized by electronically commutating the receiver input among the outputs of fixed antennas arranged, with uniform spacing of $\lambda/3$ or less, along the intended "path of motion" (e.g., the circle in above analysis). Such use of multiple antennas is strictly to designate sample positions along the path of motion, to be tapped consecutively by the commutator for connection to the receiver input, with time difference between successive samples equal to the time it would actually take a moving antenna to traverse the distance between the consecutive positions. The commutation process is then a process of sampling the phase-shift due to propagation along the path of motion in order to synthesize from those samples, by interpolation, the *motion of one hypothetical antenna* on the basis of the well-established principles of the sampling theorem of signal theory. This use of an array of antennas is quite different from the ways in which discrete antennas are used in the other RDF techniques, wherein the individuality and spatial discreteness of each antenna in the array is essential to the RDF mechanism.

AR BASED ON RECTILINEAR-MOTION-INDUCED DOPPLER

Let the receiving antenna execute a repetitive motion along a straight line of motion (LOM) of length D that makes an angle $\phi$ with the normal to the incident wavefront. Let the motion be at constant speed, in one direction, repeating $f_m$ times per second, with abrupt flyback from the last position to the starting position on the LOM. During the constant-speed traversals of the LOM, an incident signal described by $\cos\omega_c t$ will be presented to the receiver input with a frequency shift given by {2,3}

$$f_{dop} = f_m(D/\lambda)\cos\phi \tag{32}$$

whence $$\cos\phi = \frac{f_{dop}}{f_m(D/\lambda)} \tag{33}$$

In this case, $$\epsilon_{\cos\phi} = \epsilon_f/(f_m D/\lambda) \tag{34}$$

and $$\sigma_{\cos\phi} = \sigma_f/(f_m D/\lambda) \tag{35}$$

where $\epsilon_f$ is the error in counting the induced frequency shift, and $\sigma_f$ is the rms value of random errors in the frequency count.

AR BASED ON ANTENNA SWITCHING {4}

Figure 5A:
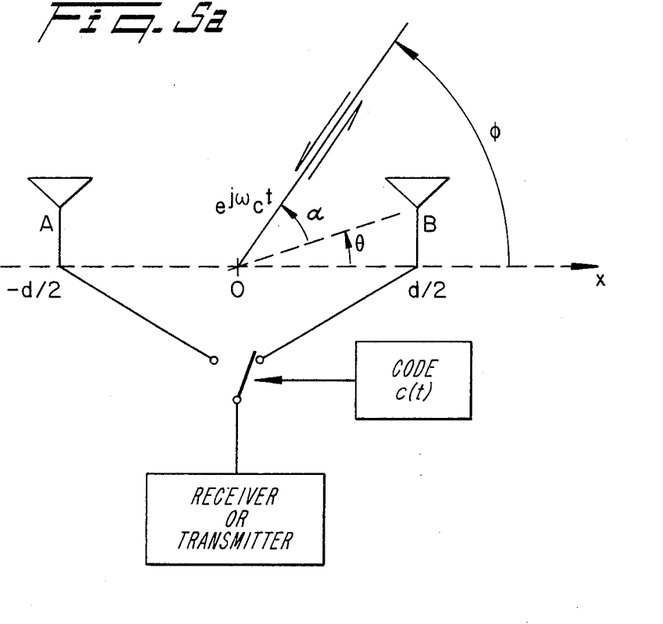
FIG. 5 is an illustrative diagram of an embodiment of the invention for deriving the radial direction cosine from the output of abrupt switching between two spaced antennas.
Figure 5B:
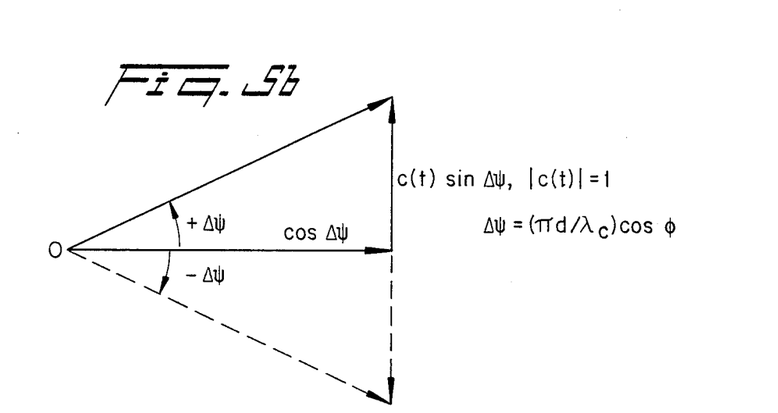

A simple antenna hopping arrangement is shown in FIG. 5. Two antennas are positioned at $x = \pm d/2$. A plane wavefront representing an unmodulated carrier $\exp j\omega_c t$ is incident at a radial angle $\phi$ relative to the line connecting the two antennas. The phase as sensed at the midpoint, $x=0$, is taken as reference. The signal as sensed at $x=d/2$ is then represented by $\exp j(\omega_c t - \Delta\psi)$, and at $x=-d/2$ by $\exp j(\omega_c t + \Delta\psi)$, where $\Delta\psi = (\pi d/\lambda)\cos\phi$. Thus, if the receiver input is switched from the output of one of the antennas to that of the other, the received signal is represented by $$e_{rec}(t) = e^{j\psi(t)} e^{j\omega_c t} \tag{36}$$

where $\psi(t) = +\Delta\psi$ or $-\Delta\psi$. In this way, binary PSK may be applied to the signal in accordance with some code. Note that $$e^{j\psi(t)} = \cos\Delta\psi \pm j\sin\Delta\psi \tag{37}$$

which, as illustrated in FIG. 5b), shows that the received signal can be decomposed into a carrier reference component of amplitude proportional to $\cos\Delta\psi$, and an orthogonally phased phase-reversal modulated component of amplitude proportional to $\sin\Delta\psi$.

Now, let the antenna hopping be determined by a coded binary sequence $c(t)$ of rectangular pulses, each of unit height, duration $T_b$ sec and positive or negative polarity. The received signal is then represented by $$\begin{aligned}e_{rec}(t) &= e^{j\omega_c t} \cdot e^{j\Delta\psi c(t)} \\ &= (\cos\Delta\psi)e^{j\omega_c t} + (\sin\Delta\psi)c(t)e^{j(\omega_c t + \pi/2)}\end{aligned} \tag{38}$$

From Eqs. (36) and (37), we observe that the induced phase step, $\Delta\psi$, can be extracted by first separating the quadrature component of the signal, cribed by Eq. (37) in the receiver, and then taking the ratio of their detected amplitudes to obtain $\sin\Delta\psi \approx \Delta\psi = (\pi d/\lambda)\cos\phi$ for $d \leq \lambda/4$. The code modulation in Eq. (38) provides a means for enhancing the detected quadrature component. An IQ phase-lock loop automatically delivers $\sin\Delta\psi \approx \Delta\psi = (\pi d/\lambda)\cos\phi$, for $d/\lambda \leq \lambda/4$.

AR BY MULTIPLE ANTENNA PATTERN INTERSECTIONS

Other candidate methods for effecting the AR funtion include a variety of techniques based on steerable intersections and nulls of patterns of multiple antennas, such as (amplitude- and/or phase-comparison) monopulse, and homer-type DOA tracking systems.

REFERENCES

1. Baghdady, E. J., "New Developments in Direction-of-Arrival Measurement Based on Adcock Antenna Clusters", NAECON'89 Conference Proc.; May, 1989.
2. Baghdady, E. J., "IDFM: A Novel Technique for Tracking, Navigation Aid and Flight Traffic Surveillance", Proceedings of the 1975 IEEE National Aerospace & Electronics Conference, NAECON'75, May, 1975.
3. Baghdady, E. J., "Frequency Modulation by Synthetic Doppler: Theory and Some Novel Applications", Proceedings of the 1987 National Aerospace & Aeronautical Electronics Conference, NAECON'87, May 1987; pp. 310–316.
4. Baghdady, E. J., "Directional Signal Modulation by Means of Switched Spaced Antennas", Proceedings of the 1987 IEEE Military Communications Conference, MILCOM'87, Oct. 1987; pp. 938–942.

While there has been described what is at present considered to be representative embodiments of the invention, it will be obvious to those skilled in the art that various changes and modifications may be made therein without departing from the invention, and it is aimed in the appended claims to cover all such changes and modifications as fall within the true spirit and scope of the invention.

For clarity in the statements of the appended claims, the following definitions of terms are provided:

Cyclic ambiguity of a phase difference measurement means failure to show if said phase difference includes some integer multiple of $2\pi$ radians, and what said integer is.

Cyclic ambiguity ratio is the first term on the right-hand-side of Eq. (3).

Direction of propagation is the angle formed between a line perpendicular to the plane of the wavefront and a reference line on the sensor platform.

Direction of arrival (DOA) is used here synonymously with "direction of propagation" relative to a receiving sensor.

Radial direction, or angle, of arrival (RDOA) is the angle, $\phi$, (see for example FIG. 5a)) between a line perpendicular to the plane of the wavefront and a reference line on the sensor platform.

Azimuth direction, or angle, of arrival (ADOA) is the angle, $\theta$, (see for example FIG. 5(a)) between the projection, on a reference horizontal plane at the location of the sensor, of a line perpendicular to the plane of the wavefront and a reference North-South line on said horizontal plane.

Elevation direction, or angle, of arrival (EDOA) is the angle, $\alpha$, (see for example FIG. 5(a)) between a line perpendicular to the plane of the wavefront and its projection on said reference horizontal plane.

DOA-computing array processing algorithm (APA) is a computational procedure based on a formulation of a system of equations derived from starting expressions for the outputs of antennas arranged in an array for sensing the directions of arrival of signal waves. Examples in the art include algorithms known as "beamforming", "maximum likelihood", "MUSIC", "ESPRIT".

Mutually coherent signal waves are different signal waves that have commensurable frequencies and t=0 (or initial) phases whose ratios are the same as the ratios of the corresponding frequencies.

Commensurable frequencies are frequencies whose ratios are integers or quotients of integers.

Diametrically spaced, positioned at the ends of the same diameter of a circle.

Resultant N-S signal is the signal expressed by Eq. (12).

Resultant E-W signal is the signal expressed by Eq. (13).

Quadrature product demodulator is one that multiplies the signal by a synchronous carrier in quadrature-phase with the carrier reference of the signal, and low-pass filters the product.

Designated characteristics includes instantaneous values of the output (i.e., of its phasor projection on the axis of reals), or of its instantaneous envelope, its instantaneous phase or phase difference from some reference or from another output, or its instantaneous frequency.

What is claimed is:

1. A method of resolving the cyclic ambiguity in the measurement of the phase difference between the outputs of two antennas, responsive to a signal wave charaterized by a wavelength and a direction of propagation relative to the line connecting the positions of said two antennas, and spaced by a known distance such that the product of said distance and the cosine of said direction of propagation, divided by said wavelength, yields a cyclic ambiguity ratio that exceeds unity, comprising the steps of estimating the cosine of said direction of propagation by a separate means, independent of said measurement;

determining the value of said wavelength by a separate measurement or computation; and using the results of said estimating and determining to evaluate said ratio.

2. A method of reducing the computational volume and time of a DOA-computing array processing algorithm for determining the direction of propagation of a traveling signal wavefront, comprising the steps of determining a first estimate of said direction of propagation by means other than said algorithm; and using said algorithm to determine an improved estimate of said direction of propagation in the vicinity of said first estimate.

3. A method of determining the cosine of the direction of propagation of a signal wavefront relative to a reference line, comprising the steps of positioning first two antennas along said reference line separated by a known distance that exceeds a wavelength of said wavefront;

positioning other antennas at points whose positions are known relative to positions of said first two antennas;

measuring the phase difference between the outputs of said first two antennas;

determining a first estimate of said cosine of the direction of propagation by means based on outputs of said other antennas not involving cyclically ambiguous phase difference measurements;

employing said first estimate to compute the cyclic ambiguity ratio that resolves any cyclic ambiguity in the result of said measuring of the phase difference, thus ascertaining an unambiguous measure of said phase difference; and using said unambiguous measure of said phase difference to determine an improved second estimate of said cosine of direction of propagation.

4. The method of claim 3, wherein said first and other antennas are receiving.

5. The method of claim 3, wherein said first and other antennas are transmitting;

said wavefront comprises two mutually coherent signal waves at different but commensurable frequencies each of which originates from one of said first two antennas, and a third signal wave that is separable from said two mutually coherent signal waves and originates from said other antennas; and said steps are carried out at a separate receiving site or platform.

6. A method of determining an estimate of the cosine of the direction of arrival of a traveling signal wavefront of measurable wavelength, comprising the steps of employing an array of two or more signal-sensing antennas arranged with uniform spacing around the perimeter of a circle;

taking the differences between outputs of diametrically spaced pairs of said antennas;

deriving from said differences between outputs the resultant North-South (NS) signal for the entire said array of antennas;

detecting the amplitude of said resultant NS signal;

detecting the amplitude of the output of any single one of said antennas;

determining the ratio of the amplitude of said resultant NS signal to the amplitude of the output of said single one of said antennas; and dividing said ratio by the product of one-half of the number of said antennas in the array and $\pi$ times the diameter of said circle divided by the wavelength of said signal wave.

7. A method of determining an estimate of the cosine of the radial direction of arrival of a traveling signal wavefront of measurable wavelength, comprising the steps of employing an array of two or more signal-sensing antennas arranged with uniform spacing around the perimeter of a circle;

taking the differences between outputs of diametrically spaced pairs of said antennas;

deriving from said differences between outputs the resultant East-West (EW) signal and the resultant North-South (NS) signal for the entire said array of antennas;

detecting the amplitude of each of said resultant EW and NS signals;

taking the square of the amplitude of each said resultant EW and NS signals, adding these squares of amplitudes, and then taking the square-root of the resulting sum of said squares;

taking the ratio of the amplitude of said resultant NS signal to said square-root to obtain the cosine of the azimuth angle of arrival of said signal wavefront;

detecting the amplitude of the output of any single one of said antennas;

taking the ratio of said square-root to the amplitude of the output of said single one of said antennas, and dividing this ratio by the product of one-half of the number of said antennas in the array and $\pi$ times the diameter of said circle divided by the wavelength of said signal wave, thus obtaining the cosine of the elevation angle of arrival of said signal wavefront; and multiplying said cosine of the azimuth angle of arrival and said cosine of the elevation angle of arrival to obtain the cosine of said radial angle of arrival.

8. A method of determining an estimate of the cosine of the radial direction of arrival of a traveling signal wavefront of measurable wavelength, comprising the steps of employing an array of two or more antennas arranged with uniform spacing around the perimeter of a circle, and an additional antenna positioned off said perimeter;

taking the differences between outputs of diametrically spaced pairs of said antennas arranged around said perimeter;

deriving from said differences between outputs the resultant North-South (NS) signal for the entire said array of antennas;

detecting the amplitude of said resultant NS signal;

detecting the amplitude of the output of said additional antenna;

determining the ratio of the amplitude of said resultant NS signal to the amplitude of the output of said additional antenna; and dividing said ratio by the product of one-half of the number of said antennas on perimeter and $\pi$ times the diameter of said circle divided by the wavelength of said signal wave.

9. A method of determining an estimate of the cosine of the radial direction of arrival of a traveling signal wavefront of measurable wavelength, comprising the steps of employing an array of two or more antennas arranged with uniform spacing around the perimeter of a circle, and an additional antenna at the center of said circle;

taking the differences between the outputs of diametrically spaced pairs of said antennas that are arranged around said perimeter;

deriving from said differences between outputs the resultant NS signal for the entire said array of antennas around said perimeter;

taking the output of said additional antenna and shifting its phase $\pi/2$ radians to obtain its quadrature-phase replica; and taking the ratio of said resultant NS signal to said quadrature-phase replica and dividing this ratio by the product of one-half of the number of said antennas on perimeter and $\pi$ times the diameter of said circle divided by the wavelength of said signal wave.

10. A method of determining an estimate of the cosine of the radial direction of arrival of a traveling signal wavefront of measurable wavelength, comprising the steps of employing an array of two or more antennas arranged with uniform spacing around the perimeter of a circle, and an additional antenna at the center of said circle;

taking the differences between the outputs of diametrically spaced pairs of said antennas that are arranged around said perimeter;

taking the output of said additional antenna, to be referred to as the center antenna output;

shifting the frequency of one of said resultant NS signal or said center antenna output by a fixed amount, sufficient to make a signal at the unshifted frequency separable completely from a signal at the shifted frequency, to obtain corresponding frequency-shifted signal;

bandpass amplitude-limiting signal corresponding to said resultant NS signal, to obtain signal one;

amplifying signal corresponding to said center antenna output well above the level of signal corresponding to said resultant NS signal, to obtain signal two;

summing said signal two and signal corresponding to said resultant NS signal, to obtain signal three;

amplitude-limiting said signal three, to obtain signal four;

selecting from said signal four only the component centered at the frequency of the signal corresponding to said resultant NS signal, to obtain signal five; and multiplying said signal one and said signal five, lowpass filtering the result and calibrating the output of said lowpass filtering to read the cosine of said radial direction of arrival.

11. A method of determining an estimate of the cosine of the direction of arrival of a signal wavefront of measurable wavelength, comprising the steps of employing an array of three or more antennas arranged around the perimeter of a circle;

commutating among the terminals of said antennas to simulate a single antenna in continuous motion around said circle with an angular velocity equal to the frequency of the commutator-clock signal;

detecting the Doppler sinusoidal frequency modulation induced by said simulated antenna continuous motion; and multiplying said detected Doppler sinusoidal frequency modulation by said commutator-clock signal, lowpass filtering the product and analyzing the result to evaluate a determinant of the direction of arrival of said signal wavefront.

12. The method of claim 11, wherein said multiplying step comprises the steps of setting the phase of said commutator-clock signal to correspond to the phase of said detected Doppler sinusoidal frequency modulation for zero-azimuth, to obtain a zero-azimuth reference-clock signal;

multiplying said zero-azimuth reference clock signal with said detected Doppler sinusoidal frequency modulation, lowpass filtering the product and calibrating the result to read the cosine of the radial direction of arrival of said wavefront.

13. The method of claim 11, wherein said multiplying step comprises the steps of setting the phase of said commutator-clock signal to correspond to the phase of said detected Doppler sinusoidal frequency modulation for zero-azimuth, to obtain a zero-azimuth reference-clock signal;

shifting the phase of said zero-azimuth reference-clock signal $\pi/2$ radians, to obtain a quadrature-azimuth reference-clock signal;

multiplying said zero-azimuth reference-clock signal with said detected Doppler sinusoidal frequency modulation, and lowpass filtering the product to obtain output A;

multiplying said quadrature-azimuth reference clock signal with said detected Doppler sinusoidal frequency modulation, and lowpass filtering the product to obtain output B; and employing said output A and said output B to determine the direction of arrival of said signal wavefront.

14. The method of claim 13 wherein said employing of said output A and said output B comprises dividing said output B by said output A to obtain the tangent of the azimuth direction of arrival.

15. The method of claim 13 wherein said employing of said output A and said output B comprises applying said output A across one set of cathode-ray tube (CRT) deflection plates, and said output B across the other orthogonal set of CRT deflelection plates, to display the azimuth direction of arrival of said signal wavefront.

16. The method of claim 13 wherein said employing of said output A and said output B comprises
computing the square-root of the sum of the squares of said output A and said output B; and
calibrating said square-root to read the value of the cosine of the elevation direction of arrival of said signal wavefront.

17. The method of claim 13 wherein said employing of said output A and said output B comprises
computing the square-root of the sum of the squares of said output A and said output B; and
dividing said output A by said square-root to obtain the cosine of the azimuth direction of arrival (ADOA) of said signal wavefront;
calibrating said square-root to read the value of the cosine of the elevation direction of arrival (EDOA) of said signal wavefront; and
multiplying said cosine of ADOA and said cosine of EDOA to obtain the cosine of the radial direction of arrival (RDOA) of said signal wavefront.

18. A method of estimating the cosine of the radial direction of arrival (RDOA) of a signal wavefront of measurable wavelength, comprising the steps of
employing two antennas spaced by less than said signal wavefront wavelength;
switching abruptly between the terminals of said antennas;
applying the signal output of said switching to a quadrature product demodulator; and
computing the cosine of said RDOA from the low-pass output of said quadrature product demodulator.

19. A method of estimating the cosine of the direction of arrival of a signal wavefront of measurable wavelength, comprising the steps of
providing a set of sensors at different positions in space for intercepting said wavefront;
performing measurements of designated characteristics of the outputs of said sensors taken singly or in combinations;
formulating an algebraic system of simultaneous equations relating the results of said measurements, with trigonometric functions of radial, azimuth and elevation direction angles, and assumed errors in same, as unknowns; and
solving said system of simultaneous equations for said trigonometric functions.

20. The method of claim 19 wherein said solving step comprises
determining a first estimate of the solution to said system of simultaneous equations by means other than said system of equations; and
utilizing said first estimate so as to initiate iterations of the algrithm for solving said system of equations for successively more refined estimates.

21. An apparatus for resolving the cyclic ambiguity in a direction of arrival determination for a travelling signal wavefront comprising:
means for measuring phase difference between outputs of two antennas, responsive to a signal wave characterized by a wavelength and a direction of propagation relative to a line connecting the positions of said two antennas, and spaced by a known distance such that a product of said known distance and a cosine of said direction of propagation, divided by said wavelength, yields a cyclic ambiguity ratio that exceeds unity;
means for estimating the cosine of said direction of propagation, separately and independently of said measurement;
means for determining the value of said wavelength; and,
means for evaluating said cyclic ambiguity ratio using the outputs of said means for estimating and said means for determining.

22. An apparatus for reducing the computational volume and time of a DOA-computing array processing algorithm for determining the direction of propagation of a travelling signal wavefront, comprising:
means for determining a first estimate of said direction of propagation by operations other than those of said algorithm; and,
means for applying said algorithm to determine an improved estimate of said direction of propagation in the vicinity of said first estimate.

23. An apparatus for determining the cosine of the direction of propagation of a signal wavefront relative to a reference line, comprising:
a first antenna means including two antennas positioned along a reference line and separated by a known distance that exceeds a wavelength of a signal wavefront;
a second antenna means including other antennas positioned at points whose positions are known relative to positions of said first two antennas;
means for measuring a phase difference between outputs of said two antennas of said first antenna means to provide a result;
means for determining a first estimate of a cosine of the signal wavefront direction of propagation relative to said reference line by operations on outputs of said other antennas not involving cyclically ambiguous phase difference measurements;
means for applying said first estimate to compute a cyclic ambiguity ratio that resolves any cyclic ambiguity in the result of said measuring of the phase difference, thus ascertaining an unambiguous measure of said phase difference; and,
means for using said unambiguous measure of said phase difference to determine an improved second estimate of said cosine of direction of propagation.

24. The apparatus of claim 23, wherein said first and second antenna means are receiving antennas.

25. The apparatus of claim 23, wherein:
said first and second antenna means are transmitting antennas;
said signal wavefront includes two mutually coherent signal waves at different but commensurable frequencies each of which originates from one of said first two antennas, and a third signal wave that is separable from said two mutually coherent signal waves and originates from said other antennas; and,
said means for measuring, means for determining, means for applying and means for using are located at a separate receiving site or platform.

26. An apparatus for estimating a direction of arrival cosine for a travelling signal wavefront of measurable wavelength to determine direction of arrival of said travelling signal wavefront, comprising:
   antenna means including an entire array of two or more signal-sensing antennas arranged with uniform spacing around a perimeter of a circle;
   means for taking differences between outputs of diametrically spaced pairs of said antennas;
   means for deriving from said differences between outputs a resultant North-South (NS) signal for the entire said array of antennas;
   means for detecting an amplitude of said resultant NS signal;
   means for detecting an amplitude of an output of any single one of said antennas;
   means for determining a ratio of the amplitude of said resultant NS signal to the amplitude of the output of said single one of said antennas;
   means for dividing said ratio by a product of one-half of the number of said antennas in the array and $\pi$ times the diameter of said circle divided by the wavelength of said signal wavefront to produce a cosine value; and,
   means for using said cosine value to determine the direction of arrival of said travelling signal wavefront.

27. An apparatus for estimating the radial direction of arrival cosine of a travelling signal wavefront of measurable wavelength to determine the direction of arrival of said travelling signal wavefront, comprising:
   antenna means including an entire array of two or more signal-sensing antennas arranged with uniform spacing around the perimeter of a circle;
   means for taking differences between outputs of diameterically spaced pairs of said antennas;
   means for deriving from said differences between outputs a resultant East-West (EW) signal and a resultant North-South (NS) signal for the entire said array of antennas;
   means for detecting an amplitude of each of said resultant EW and NS signals;
   means for taking a square of the amplitude of each of said resultant EW and NS signals, adding these squares of amplitudes, and then taking a square-root of the resulting sum of said squares;
   means for taking a ratio of the amplitude of said resultant NS signal to said square-root to obtain a cosine of the azimuth angle of arrival of said signal wavefront;
   means for detecting an amplitude of an output of any single one of said antennas;
   means for taking the ratio of said square-root to the amplitude of the output of said single one of said antennas, and dividing this ratio by a product of one-half of the number of said antennas in the array and $\pi$ times the diameter of said circle divided by the wavelength of said signal wavefront, thus obtaining a cosine of the elevation angle of arrival of said signal wavefront;
   means for multiplying said cosine of the azimuth angle of arrival and said cosine of the elevation angle of arrival to obtain the cosine of said radial angle of arrival; and,
   means for using said cosine of said radial angle of arrival to determine the direction of arrival of said travelling signal wavefront.

28. An apparatus for estimating the radial direction of arrival cosine of a travelling signal wavefront of measurable wavelength to determine the direction of arrival of said travelling signal wavefront, comprising:
   a first antenna means including an entire array of two or more antennas arranged with uniform spacing around the perimeter of a circle, and a second antenna means including an antenna positioned off said perimeter;
   means for taking differences between outputs of diametrically spaced pairs of said antennas arranged around said perimeter;
   means for deriving from said differences between outputs a resultant North-South (NS) signal for the entire said array of antennas in said first antenna means;
   means for detecting an amplitude of said resultant NS signal;
   means for detecting an amplitude of an output of said antenna in said second antenna means;
   means for determining a ratio of the amplitude of said resultant NS signal to the amplitude of the output of said antenna in said second antenna means;
   means for dividing said ratio by a product of one-half of the number of said antennas on said perimeter and $\pi$ times the diameter of said circle divided by the wavelength of said signal wave to produce a cosine value; and,
   means for using said cosine value to determine the direction of arrival of said travelling signal wavefront.

29. An apparatus for estimating the radial direction of arrival cosine of a travelling signal wavefront of measurable wavelength to determine the direction of arrival of said travelling signal wavefront, comprising:
   a first antenna means including an entire array of two or more antennas arranged with uniform spacing around the perimeter of a circle, and a second antenna means comprising an antenna at the center of said circle;
   means for taking differences between outputs of diametrically spaced pairs of said first antenna means;
   means for deriving from said differences between outputs a resultant NS signal for the entire said array of said first antenna means;
   means for taking an output of said antenna in said second antenna means and shifting its phase $\pi/2$ radians to obtain its quadrature-phase replica;
   means for taking a ratio of said resultant NS signal to said quadrature-phase replica and dividing this ratio by a product of one-half of the number of antennas in said first antenna means and $\pi$ times the diameter of said circle divided by the wavelength of said signal wavefront to produce a cosine value; and,
   means for using said cosine value to determine the direction of arrival of said travelling signal wavefront.

30. An apparatus for estimating the radial direction of arrival cosine of a travelling signal wavefront of measurable wavelength to determine the direction of arrival of said travelling signal wavefront, comprising:
   a first antenna means including an entire array of two or more antennas arranged with uniform spacing around the perimeter of a circle, and a second antenna means including an antenna at the center of said circle;

means for taking differences between outputs of diametrically spaced pairs of said antennas that are arranged around said perimeter;

means for deriving from said differences between outputs a resultant NS signal for the entire said array of antennas around said perimeter;

means for taking a center antenna output of said antenna in said second antenna means;

means for shifting the frequency of one said resultant NS signal or said center antenna output by a fixed amount, sufficient to make a signal at the unshifted frequency separable completely from a signal at the shifted frequency, to obtain a corresponding frequency-shifted signal;

means for bandpass amplitude-limiting a signal corresponding to said resultant NS signal, to obtain signal one;

means for amplifying a signal corresponding to said center antenna output well above the level of signal corresponding to said resultant NS signal, to obtain signal two;

means for summing said signal two and said signal corresponding to said resultant NS signal, to obtain signal three;

means for amplitude-limiting said signal three, to obtain signal four;

means for selecting from said signal four only a component centered at the frequency of the signal corresponding to said resultant NS signal, to obtain signal five; and, means for multiplying said signal one and said signal five, lowpass filtering the result and calibrating the output of said lowpass filtering to read the cosine of said radial direction of arrival.

31. An apparatus for estimating the elevation angle of arrival cosine of a travelling signal wavefront of measurable wavelength to determine the direction of arrival of said travelling signal wavefront, comprising:

a first antenna means including an entire array of two or more signal-sensing antennas arranged with uniform spacing around the perimeter of a circle, and a second antenna means positioned off said perimeter and including an antenna erected vertical to a plane of said circle and two mutually orthogonal antennas laid in said plane, said first and second antenna means receiving a travelling signal wavefront;

means for taking differences between outputs of diametrically spaced pairs of said first antennas means;

means for deriving from said differences between outputs a resultant East-West (EW) signal and a resultant North-South (NS) signal for the entire said array of antennas in said first antenna means;

means for detecting an amplitude of each of said resultant EW and NS signals;

means for taking a square of the amplitude of each of said resultant EW and NS signals, adding the squares of amplitudes, and then taking a square-root of the resulting sum of said squares, to obtain output one;

means for detecting output amplitudes of antennas in said second antenna means, taking squares of said amplitudes, adding said squares of amplitudes, and then taking a square-root of the resulting sum of said squares and multiplying said square root by the product of one-half of the number of antennas in said first antenna means and $\pi$ times the diameter of said circle divided by the wavelength of said signal wavefront, thus obtaining output two;

means for taking a ratio of said output one to said output two, and for taking a square root of said ratio to produce a cosine value; and, means for using said cosine value to determine the direction of arrival of said travelling signal wavefront.

32. An apparatus for estimating the direction of arrival cosine of a signal wavefront of measurable wavelength to determine the direction of arrival of said signal wavefront comprising:

antenna means including an entire array of three or more antennas arranged around the perimeter of a circle;

means for commutating among terminals of said antennas to simulate a single antenna in continuous motion around said circle with an angular velocity equal to a frequency of a commutator-clock signal;

means for detecting a Doppler sinusoidal frequency modulation induced by said simulated antenna continuous motion; and, means for multiplying said detected Doppler sinusoidal frequency modulation by said commutator-clock signal, lowpass filtering the product to provide a result and analyzing the result to evaluate a determinant of the direction of arrival of said signal wavefront.

33. The apparatus of claim 32, wherein the multiplying means further comprises:

means for setting a phase of said commutator-clock signal to correspond to a phase of said detected Doppler sinusoidal frequency modulation for zero azimuth, to obtain a zero-azimuth reference-clock signal;

means for multiplying said zero-azimuth reference clock signal with said detected Doppler sinusoidal frequency modulation, lowpass filtering the product to provide said result and calibrating the result to read the cosine of the radial direction of arrival of said wavefront.

34. The apparatus of claim 32, wherein said multiplying means further comprises:

means for setting a phase of said commutator-clock signal to correspond to a phase of said detected Doppler sinusoidal frequency modulation for zero azimuth, to obtain a zero-azimuth reference-clock signal;

means for shifting the phase of said zero-azimuth reference-clock signal $\pi/2$ radians, to obtain a quadrature-azimuth reference-clock signal;

means for multiplying said zero-azimuth reference-clock signal with said detected Doppler sinusoidal frequency modulation, and lowpass filtering the product to obtain output A;

means for multiplying said quadrature-azimuth reference signal with said detected Doppler sinusoidal frequency modulation, and lowpass filtering the product to obtain output B; and, means for employing said output A and said output B to determine the direction of arrival of said signal wavefront.

35. The apparatus of claim 34, wherein said means for employing said output A and said output B further comprises means for dividing said output B by said output A to obtain the tangent of an azimuth direction of arrival.

36. The apparatus of claim 34, wherein said means for employing said output A and said output B further comprises a cathode-ray tube (CRT), with said output A applied across one set of deflection plates, and said output B applied across another orthogonal set of CRT deflection plates, to display an azimuth direction of arrival of said signal wavefront.

37. The apparatus of claim 34, wherein said means for employing said output A and said output B further comprises:
- means for computing a square-root of a sum of squares of said output A and said output B; and
- means for calibrating said square-root to read a value of the elevation direction of arrival cosine of said signal wavefront.

38. The apparatus of claim 34, wherein said means for employing said output A and said output B further comprises:
- means for computing a square-root of a sum of squares of said output A and said output B;
- means for dividing said output A by said square-root to obtain a cosine of an azimuth direction of arrival (ADOA) of said signal wavefront;
- means for calibrating said square-root to read a cosine value of an elevation direction of arrival (EDOA) of said signal wavefront; and,
- means for multiplying said cosine of ADOA and said cosine of EDOA to obtain the cosine of a radial direction of arrival (RDOA) of said signal wavefront.

39. An apparatus for estimating the radial direction of arrival (RDOA) cosine of a signal wavefront of measurable wavelength to determine the direction of arrival of said signal wavefront, comprising:
- antenna means including two antennas spaced by less than a signal wavefront wavelength;
- receiver means including a quadrature-product demodulator;
- means for switching an input of said receiver means abruptly between terminals of said antennas;
- means for applying a signal output of said switching means to said quadrature product demodulator; and,
- means for computing a cosine of a RDOA of said signal wavefront from a lowpass output of said quadrature product demodulator.

40. An apparatus for estimating a cosine of the direction of arrival of a signal wavefront of measurable wavelength comprising:
- sensor means including sensors set at different positions in space for intercepting a signal wavefront;
- means for performing measurements of designated characteristics of outputs of said sensors taken singly or in combination; and,
- means for formulating an algebraic system of simultaneous equations relating results of said measurements, with trigonometric functions of radial, azimuth and elevation direction angles, and errors in same, as unknowns; and for solving said system of simultaneous equations for said trigonometric function.

41. The apparatus of claim 40, wherein said means for formulating and solving performs said solving by:
- determining a first estimate of a solution to said system of simultaneous equations by means other than said system of equations; and,
- utilizing said first estimate to initiate iterations of an algorithm for solving said system of equations for successively more refined estimates.

* * * * *